(12) United States Patent
Louie

(10) Patent No.: US 8,039,144 B2
(45) Date of Patent: Oct. 18, 2011

(54) ELECTROCHEMICAL CELL WITH SINGULAR COUPLING AND METHOD FOR MAKING SAME

(75) Inventor: Edmond Louie, Snellville, GA (US)

(73) Assignee: Motorola Mobility, Inc., Libertyville, IL (US)

( * ) Notice: Subject to any disclaimer, the term of this patent is extended or adjusted under 35 U.S.C. 154(b) by 1131 days.

(21) Appl. No.: 11/776,833

(22) Filed: Jul. 12, 2007

(65) Prior Publication Data

US 2009/0017370 A1    Jan. 15, 2009

(51) Int. Cl.
*H01M 2/24* (2006.01)
(52) U.S. Cl. ........................................ 429/161; 429/178
(58) Field of Classification Search ................ 429/124, 429/161, 162, 170; 29/632.1–623.5, 730–731
See application file for complete search history.

(56) References Cited

U.S. PATENT DOCUMENTS

| 6,576,365 | B1 | 6/2003 | Meitav et al. |
| 6,641,027 | B2 | 11/2003 | O'Connell et al. |
| 6,743,546 | B1 * | 6/2004 | Kaneda et al. ............... 429/127 |
| 6,746,797 | B2 | 6/2004 | Benson et al. |
| 6,838,209 | B2 | 1/2005 | Langan et al. |
| 2005/0053836 | A1 * | 3/2005 | Kelley et al. ............... 429/218.2 |

* cited by examiner

*Primary Examiner* — Barbara Gilliam
*Assistant Examiner* — Maria J Laios

(57) ABSTRACT

An electrochemical cell (400) is provided having a singular electrical coupling. A flexible substrate (200) having an interconnect extension (209) is coupled to an electrochemical cell structure (300). The assembly is then placed into an enclosure (301), such that a portion of the flexible substrate (200) is disposed within the enclosure (301). The enclosure (301) is then sealed about the interconnect extension (209) such that the interconnect extension (209) projects distally from the closure (404) as a singular electrical coupling. Embodiments of the invention facilitate the manufacture of narrow cells without compromising cell reliability.

15 Claims, 5 Drawing Sheets

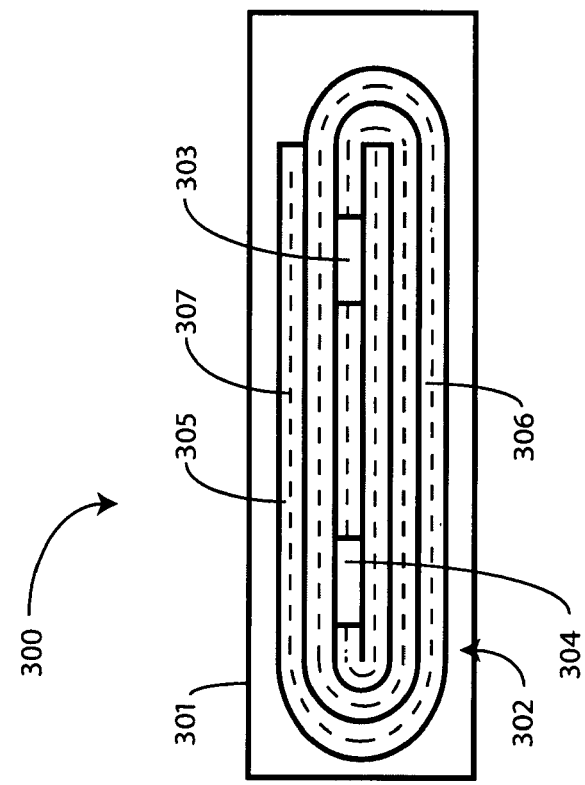
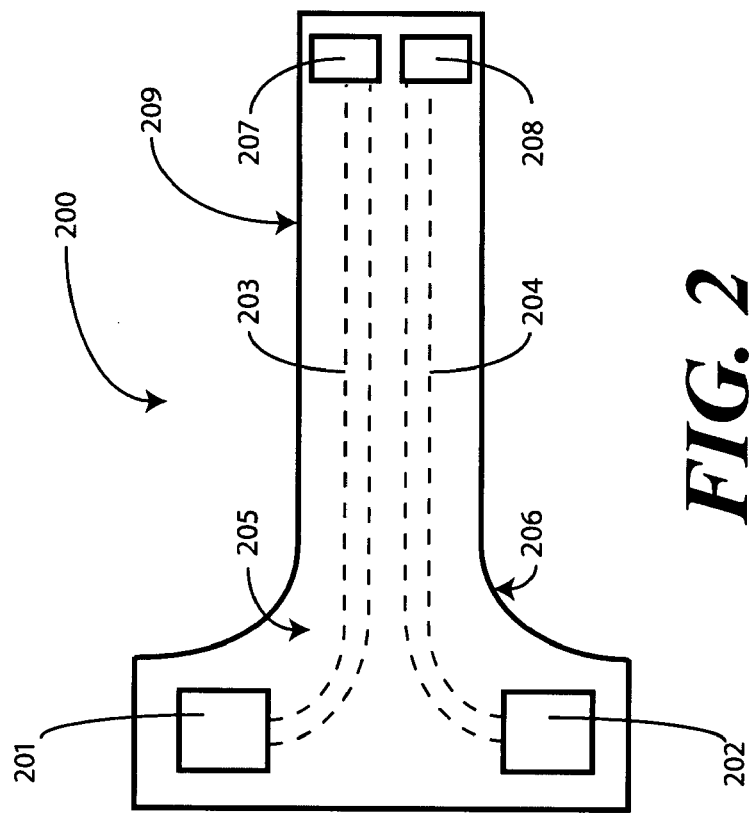
FIG. 3
FIG. 2

ELECTROCHEMICAL CELL WITH SINGULAR COUPLING AND METHOD FOR MAKING SAME

BACKGROUND

1. Technical Field

This invention relates generally to electrochemical cell construction, and more particularly to an electrochemical cell having a singular external coupling.

2. Background Art

Portable electronic devices are becoming more and more popular. Many people today use multiple portable electronic devices daily. These devices include mobile telephones, personal digital assistants, portable music players, cameras, calculators, watches, radios, and computers, just to name a few. These portable devices derive their portability from batteries. Batteries, including rechargeable batteries, allow portable devices to slip the surly bonds of wall outlets and touch the face of a world on the move.

Each battery, be it rechargeable or primary, relies on an electrochemical cell for energy storage. While there may be other components in the battery pack, including circuit boards, mechanical assemblies, protection components, charging components, fuel gauging circuits, temperature measurement circuits and indicator circuits, energy is stored and released by the electrochemical cell.

Each electrochemical cell includes a cathode and an anode. The two are electrically isolated, and offer a current path into or away from the electrochemical cell. Turning now to FIG. 1, illustrated therein is a prior art rechargeable cell 100. In such a rechargeable cell 100, the anode and cathode are electrically isolated by a separator. The anode-separator-cathode assembly 101 is then either wound in a "jellyroll" configuration or laminated in a stack.

An anode conductive tab 102 and a cathode conductive tab 103 are coupled to the anode and cathode, respectively. Each tab 102,103, generally constructed from metal foil, is then joined to an external tab 104,105. The external tabs 104,105 provide electrical conductivity to external components. As with the anode and cathode, the conductive tabs 102,103 and the external tabs 102,103 must remain electrically isolated from each other.

To accomplish the electrical isolation, the cell assembly is placed in an enclosure 106. The opening 107 of the enclosure 106 is then sealed about the external tabs 104,105. A tight seal is required about the external tabs 104,105 to prevent any electrolyte from escaping the enclosure 106. The tight seal also prevents dust, moisture, and debris from entering the cell.

To ensure a tight seal, with no space or pockets on the sides of the external tabs 104,105, plastic sealing members 108,109 are placed about the external tabs 104,105. The enclosure 106 is then sealed about the plastic sealing members 108,109.

The prior art configuration of FIG. 1 works well as long as the width 110 of the cell structure 101 is sufficient to accommodate two external tabs, associated components, and a corresponding mechanical seal. When the width 110 of the cell structure 101 becomes smaller, the external tabs 104,105 get closer and closer together. This can compromise reliability, as the external tabs 104,105—when too close—can short the anode and cathode. Further, the quality of the manufacturing process used to construct the cell can be adversely affected when the external tabs 104,105 get too close together.

There is thus a need for an improved cell interconnect that accommodates narrow electrochemical cells.

BRIEF DESCRIPTION OF THE DRAWINGS

FIG. 2 illustrates a flexible substrate in accordance with embodiments of the invention.

FIG. 3 illustrates one embodiment of an electrochemical cell, viewed sectionally, in accordance with embodiments of the invention.

Figure 1:
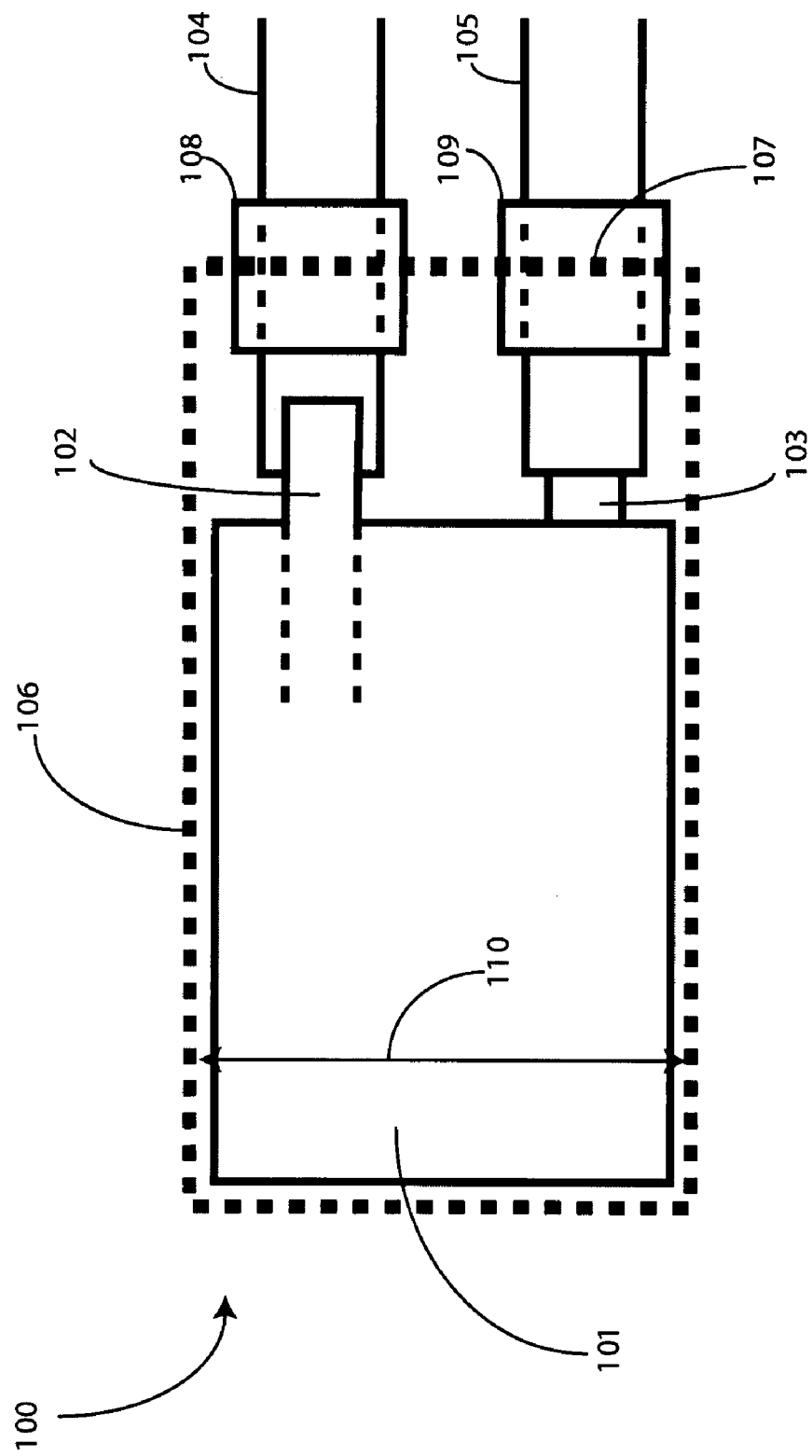
FIG. 1 illustrates a prior art electrochemical cell.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Briefly, embodiments of the present invention provide an interconnect structure that allows narrower electrochemical cells be assembled without risk of shorting external tabs and without sacrificing manufacturing quality control. In contrast to the dual external tabs of the prior art, embodiments of the invention include a flexible substrate that connects to the anode and cathode inside the cell enclosure. A singular cell coupling then emanates from the cell. In one embodiment, the singular cell coupling comprises electrical traces—coupled to the anode and cathode—that pass along a flexible substrate to an external anode and cathode connector disposed on the singular cell coupling.

Turning now to FIG. 2, illustrated therein is a flexible substrate 200 in accordance with embodiments of the invention. The flexible substrate 200 is manufactured from a flexible material and has electrical traces disposed upon, or disposed between, the layers of flexible material. The flexible substrate 200 is in effect a flexible printed wiring board. One example of a flexible material suitable for use with the invention is Kapton® polyimide film manufactured by DuPont. Flexible material is preferred, as it can easily be manipulated, folded, or bent when coupling the electrochemical cell to a circuit. However, it will be clear to those of ordinary skill in the art having the benefit of this disclosure that the invention is not so limited. Semi-rigid and rigid materials, including FR4 fiberglass, or other compatible substrates, may be substituted for the flexible material. For example, a flexible substrate may be a pair of electrical traces on stacked substrates with an insulator disposed between the substrates. Alternatively, the flexible substrate may be ceramic or other equivalent material.

The flexible substrate 200 includes a cathode interface 201 and an anode interface 202. The cathode interface 201 and the anode interface 202, in one embodiment, are metal pads disposed along the flexible substrate 200. Tabs connected to the anode and cathode of an electrochemical cell may be coupled to the cathode interface 201 and anode interface 202 by soldering, crimping, or welding. In one embodiment, the tabs are electrically coupled to the cathode interface 201 and anode interface 202 by spot welding. Where other bonding methods are used, such as soldering for example, additional protective coverings may be required to ensure that the connection material does not interact with surrounding electrolyte.

The flexible substrate 200 has a first face 205 and a second face 206. In one embodiment, both the cathode interface 201 and anode interface 202 are disposed on the same side of the flexible substrate 200. For example, the cathode interface 201 and anode interface 202 may be both disposed on the first face 205. Alternatively, the cathode interface 201 and anode interface 202 may be disposed on opposite faces, with the cathode interface 201 being disposed on the first face 205 and the anode interface 202 being disposed on the second face 206, or vice versa. When the cathode interface 201 and anode interface 202 are disposed on opposite faces, the overall dimensions of the flexible substrate 200 may be reduced, as the cathode interface 201 and anode interface 202 may be effectively placed atop each other with the flexible substrate 200 therebetween, such that the cathode interface 201 is one face and the anode interface 202 is on the other.

The cathode interface 201 and anode interface 202 are coupled by conductive traces 203,204 to an external cathode connector 207 and an external anode connector 208. The conductive traces, which include a first conductive trace 203 and a second conductive trace 204, begin at the cathode interface 201 and the anode interface 202, respectively. The first conductive trace 203 and the second conductive trace 204 then traverse an interconnect extension 209 and couple to the external cathode connector 207 and the external anode connector 208, respectively. In one embodiment, the first conductive trace 203 and second conductive trace 204 comprise copper traces disposed between two layers of substrate material. Note that other materials may also be used. For example, the first conductive trace 203 may be any of copper, aluminum, or nickel. The second conductive trace 204 may be either copper or nickel.

The external cathode connector 207 and external anode connector 208 are conductive tabs, distally disposed along the flexible substrate 200 from the cathode interface 201 and anode interface 202, suitable for coupling to an electrical connector, printed circuit board, or other circuitry. The external cathode connector 207 and the external anode connector 208 are referred to collectively as an "external coupling." The cathode interface 201, anode interface 202, external cathode connector 207, and external anode connector 208, in one embodiment, comprise nickel-plated copper pads.

The interconnect extension 209 is a length of flexible substrate material through which the first conductive trace 203 and the second conductive trace 204 pass. The interconnect extension 209, being a part of the flexible substrate 200, includes a first face 205 and a second face 206. The first conductive trace 203 and a second conductive trace 204 may be disposed on the same face or on opposite faces.

As will be described below, the enclosure of the electrochemical cell is sealed about the interconnect extension 209 such that the cathode interface 201 and anode interface 202 couple to the cathode tab and anode tab, respectively, inside the enclosure, while the external cathode connector 207 and external anode connector 208 are outside the enclosure. In so doing, the interconnect extension 209 serves as a singular electrical cell coupling emanating as a unitary extension from the cell enclosure. Further, as the first conductive trace 203 and second conductive trace 204 are fixedly disposed on the interconnect extension 209, the first conductive trace 203 and second conductive trace 204 cannot short together, thereby improving the reliability of cells manufactured in accordance with the invention.

As illustrated with the exemplary embodiment of the flexible substrate 200 of FIG. 2, in one embodiment, the flexible substrate 200 is T-shaped. The T-shape is well suited for cells in which the cathode tab and anode tab are separated along the width of the cell. It will be clear to those of ordinary skill in the art having the benefit of this disclosure, however, that the invention is not so limited. Other shapes, including rectangles, ovals, triangle-rectangle combinations, and so forth, may also be used. Generally speaking, the shape of the flexible substrate 200 will be influenced by the physical geometry of the cell cathode-anode form factor.

Turning now to FIG. 3, illustrated therein is one embodiment of an electrochemical cell structure 300 in accordance with embodiments of the invention. The electrochemical cell structure 300 comprises a cathode 305 and an anode 306. The cathode 305 and anode 306 are electrically separated by a separator 307. The separator 307 provides electrical isolation while allowing ions to pass between the cathode 305 and anode 306.

A cathode conductive tab 303 couples to the cathode 305, while an anode conductive tab 304 couples to the anode 306. The cathode conductive tab 303 and anode conductive tab 304 serve as electrical connections to the cathode 305 and anode 306, respectively, and facilitate current flow to and from the cell. The cathode conductive tab 303 and anode conductive tab 304 are generally manufactured from a flexible foil material.

In the illustrative embodiment of FIG. 3, the cathode 305, separator 307, and anode 306 have been wound. The stacking may involve laminating or bonding the cathode 305, separator 307, and anode together. Alternatively, the cathode 305, separator 307, and anode 306 may simply press together without bonding. The cathode 305, separator 307, and anode 306 may be stacked together and wound into a "jellyroll" configuration. In such a configuration, a single cathode conductive tab 303 and a single anode conductive tab 304 are connected to the cathode 305 and anode 306. While this is one method of manufacturing a cell assembly, it will be clear to those of ordinary skill in the art that a variety of other structures exist and are suitable for use with the present invention. For example, multiple cathode layers and anode layers may be laminated and stacked together, which each cathode layer and anode layer having its own conductive tab. The corresponding stack of cathode conductive tabs is then tied together, as is the stack of anode conductive tabs. Similarly, other structures exist. Each structure, however, has common characteristics: anode, cathode, at least one anode conductive tab, and at least one cathode conductive tab.

The cell structure is placed within an enclosure 301 having an opening 302. Additional preparation procedures known in the art may additionally be performed, such as adding electrolyte, pre-charging the electrodes and de-gassing the assembly. The opening is sealed to keep the cell structure and any electrolyte material within the enclosure. As any breach in the seal can compromise reliability of the cell. Some enclosures will include a single opening that is sealed. Others may include a three-sided opening that is sealed. The enclosure 301 is generally manufactured from foil, sometimes in the form of a foil pouch. More specifically, most are made from a multi-layer polymer-aluminum-polymer material. Polymer is used to prevent the aluminum layer from shorting the cell.

The cell structure can be one of many types. One example of a cell type suitable for use with embodiments of the present invention is a lithium ion polymer cell. It will be clear to those of ordinary skill in the art having the benefit of this disclosure, however, that the invention is not so limited. Other cell chemistry structure types, in addition to lithium ion polymer, may also be used. For instance, lithium primary chemistries, lithium manganese oxide chemistries, and other chemistries may be used in accordance with embodiments of the invention.

Figure 4:
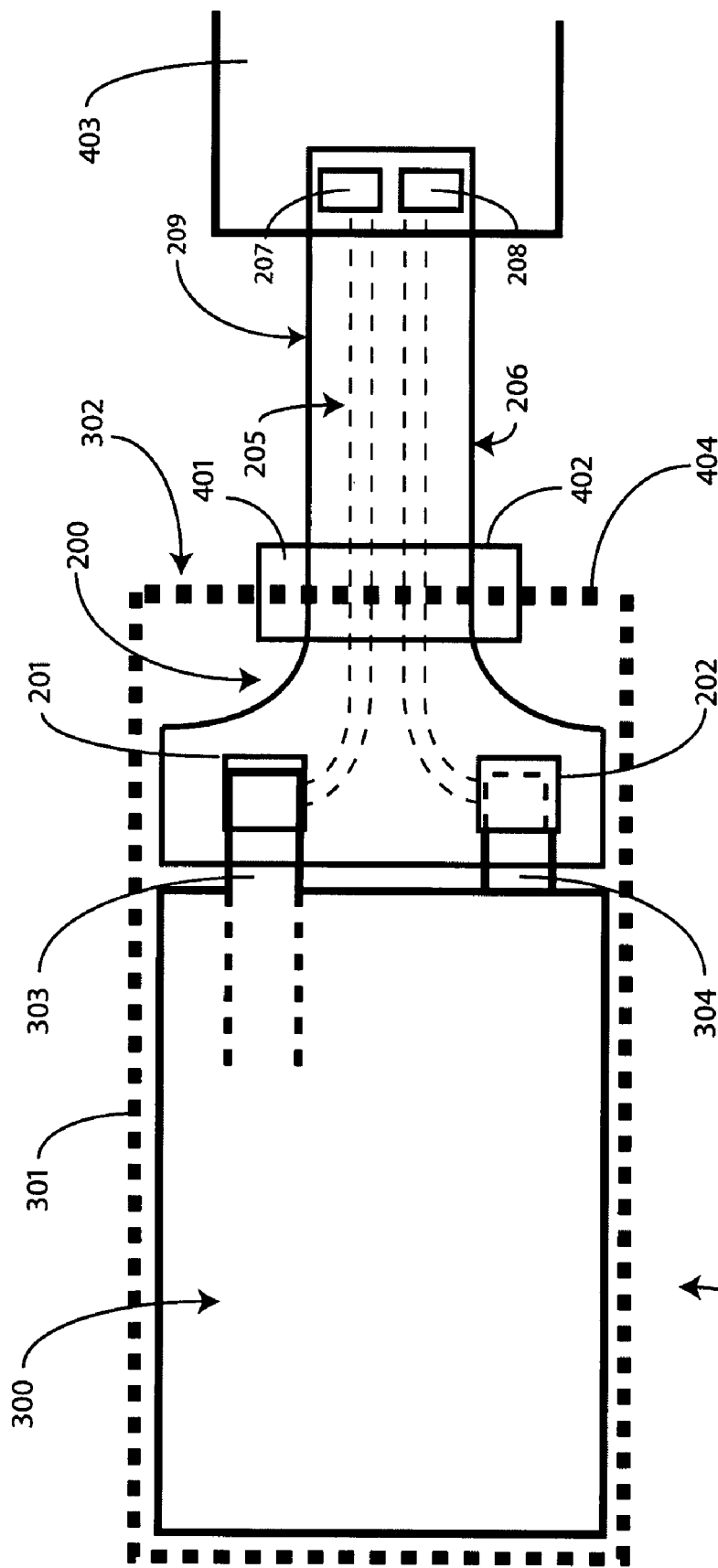
FIG. 4 illustrates one embodiment of an electrochemical cell having a singular cell coupling in accordance with the invention.

Turning now to FIG. 4, illustrated therein is one embodiment of an electrochemical cell 400 in accordance with the invention. As shown in FIG. 4, the cathode conductive tab 303 has been electrically coupled to the cathode interface 201. Similarly, the anode conductive tab 304 has been electrically coupled to the anode interface 202. This coupling may be accomplished, as mentioned earlier by soldering or welding, and in one embodiment is accomplished by spot welding.

The electrochemical cell structure 300 has been inserted into the enclosure 301 through the opening 302, such that the cathode conductive tab 303, the cathode interface 201, the anode conductive tab 304, and the anode interface 202 are completely within the enclosure 301. The opening 302 is then sealed as a closure 404 about the interconnect extension 209 such that the cathode conductive tab 303 and the anode conductive tab 304 are sealed within the enclosure 301, and the interconnect extension 209 projects distally from the closure 404 as a singular electrical cell coupling. The sealing process is preferably accomplished by heat sealing, thereby causing the polymer layer of the enclosure 301 to melt about the interconnect extension 209.

As noted above, in some embodiments the enclosure 301 will be a foil pouch. In other embodiments, the enclosure 301 may initially be a sheet of polymer-aluminum-polymer material that is folded to form a pouch. In such an embodiment, the cell structure 300 is placed on the polymer-aluminum-polymer material. The material is then folded over the cell structure 300. Two open sides are then sealed. The enclosure 301 is then filled with electrolyte. The remaining side is vacuum sealed, thereby completing the assembly.

To assist in sealing, a first sealing member 401 and a second sealing member 402, each made from plastic, may be disposed along the first face 205 and second face 206 of the interconnect extension 209, respectively. When the polymer layer of the enclosure 301 is heat sealed about the sealing members 401,402 and the interconnect extension 209, a hermetic seal is formed. The hermetic seal prevents moisture and debris from entering the enclosure 301. While heat sealing is one suitable method for creating the closure 404, others, including sonic welding may conceivably be used.

Once the closure 404 is formed, the electrochemical cell 400 may be coupled to an electrical connector, device, or circuitry. In the illustrative embodiment of FIG. 4, for example, the external cathode connector 207 and external anode connector 208 have been soldered to a printed circuit board 403. This configuration may be suitable, for instance, for a small, portable electronic device with a dedicated, internal battery.

Figure 5:
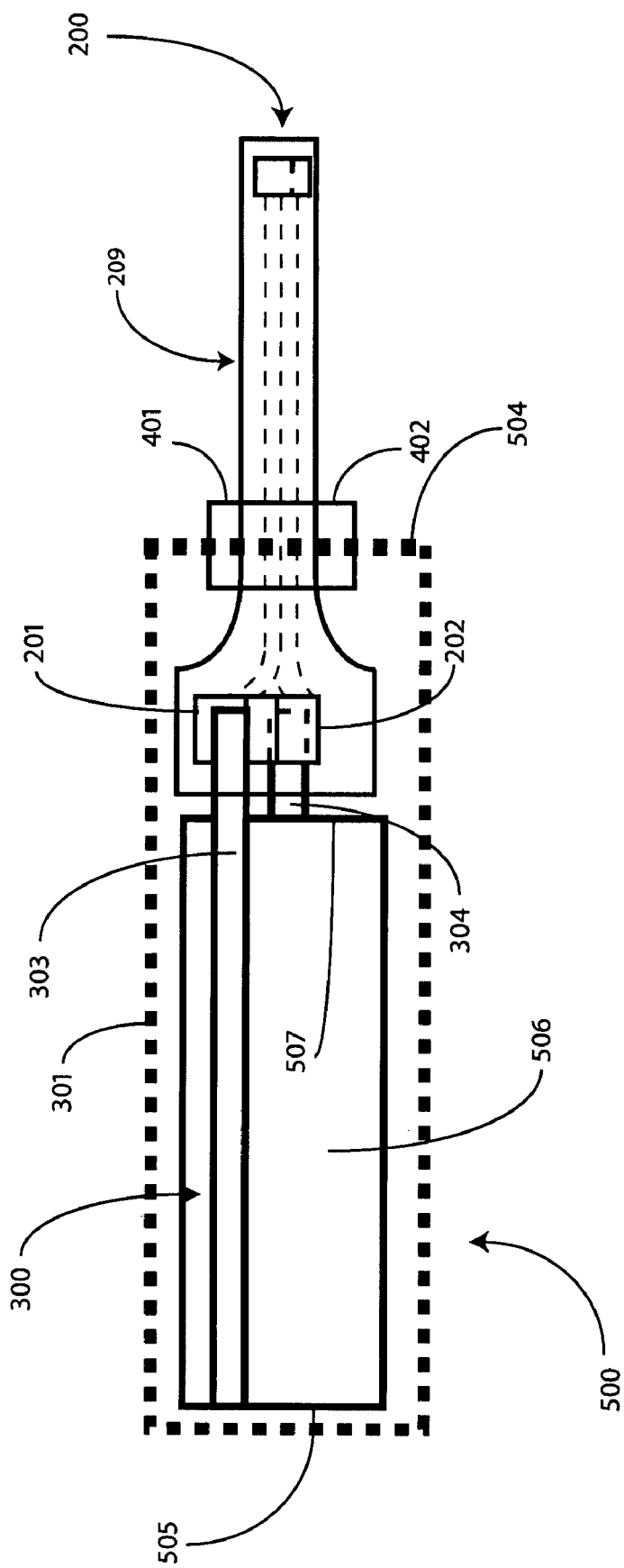
FIG. 5 illustrates one embodiment of an electrochemical cell having a singular cell coupling in accordance with the invention.

Turning now to FIG. 5, illustrated therein is an alternate embodiment of an electrochemical cell 500 in accordance with the invention. As noted above, in some embodiments of the invention, the electrochemical cell structure 300 may become too thin to accommodate side by side the cathode conductive tab 303 and the anode conductive tab 304. For example, in some applications, such as a Bluetooth earpiece speakerphone accessory, the electrochemical cell structure width may be less than 12 millimeters. In such an embodiment, an alternate conductive tab configuration is required.

In the illustrative embodiment of FIG. 5, the electrochemical cell structure 300 has a first end 507 and a second end 505. Rather than the conductive tabs emanating from the same end, to accommodate a narrower electrochemical cell structure width, one conductive tab projects from the first end 507, while the second conductive tab projects from the second end 505. In FIG. 5, the cathode conductive tab 303 projects from the second end and traverses a major face 506 of the electrochemical cell structure 300, while the anode conductive tab 304 projects from the first end. This configuration could be reversed, with the anode conductive tab 304 projecting from the second end 505 and traversing the major face 506.

In such a configuration, it is preferable for the cathode interface 201 to be disposed on one face of the flexible substrate 200, while the anode interface 202 is disposed on the other face. As with FIG. 4, a closure 504 is formed about the interconnect extension 209. Sealing members 401 and 402 may be used if required to obtain a hermetic seal.

Figure 6:
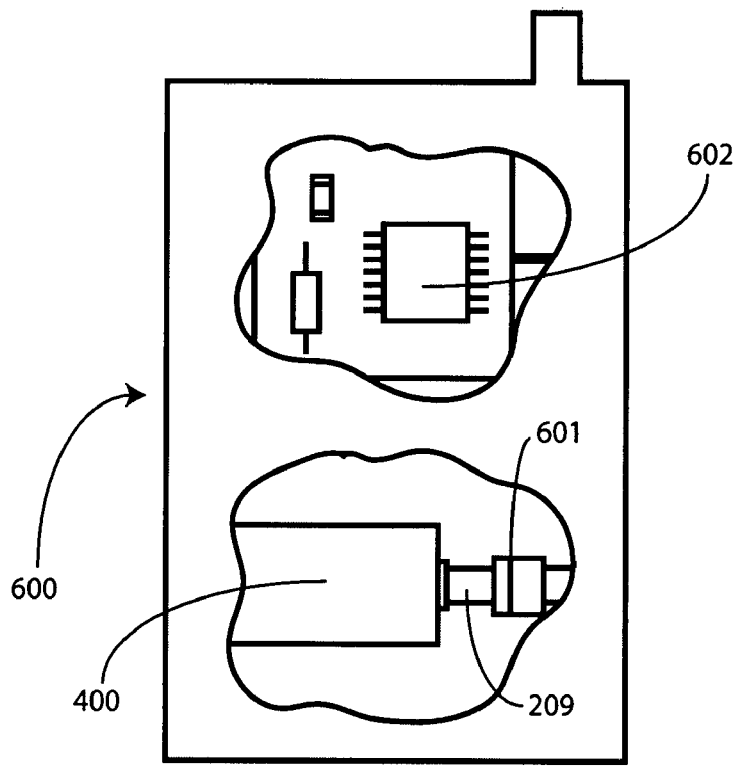
FIG. 6 illustrates one embodiment of a portable electronic device employing an electrochemical cell having a singular cell coupling in accordance with the invention.

Turning now to FIG. 6, illustrated therein is an electronic device 600 employing an electrochemical cell 400 in accordance with embodiments of the invention as a power source. Specifically, a power interconnect 601, such as an electrical connector, is used to couple the electrochemical cell 400 to control circuitry 602 disposed within the electronic device 600. The interconnect extension 209 emanates from the electrochemical cell 400 as a singular connector, and connects to the power interconnect 601. Electrochemical cells in accordance with the invention may be used to power a variety of devices, including radiotelephones, pagers, portable music players, personal digital assistants, radios, speakerphone accessories, or earbuds.

Figure 7:
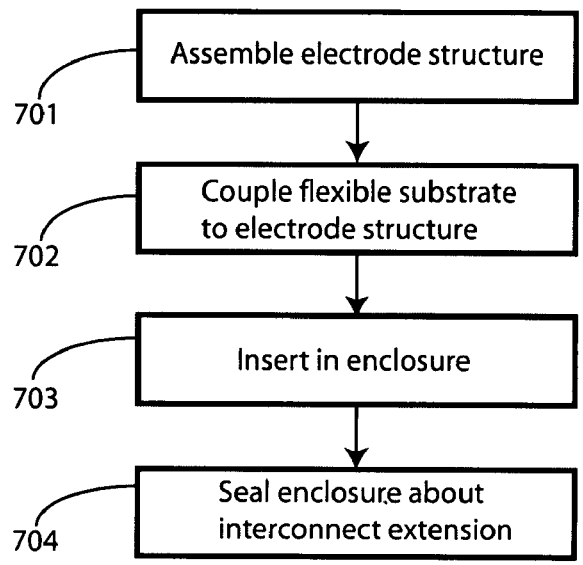
FIG. 7 illustrates one method of constructing an electrochemical cell having a singular cell coupling in accordance with the invention.

Turning now to FIG. 7, illustrated therein is one method for manufacturing an electrochemical cell in accordance with the invention. At step 701, an electrode structure is assembled by coupling an anode (306) having an anode conductive tab (304) electrically coupled thereto to a cathode (305) having a cathode conductive tab (303) electrically coupled thereto. The anode (306) and cathode (305) have a separator (307) disposed therebetween.

At step 702, a flexible substrate (200) comprising a cathode interface (201), an anode interface (202), and an interconnect extension (209) is coupled to the electrode structure. Specifically, the cathode interface (201) is coupled to the cathode conductive tab (303), while the anode interface (202) is coupled to the anode conductive tab (304).

At step 703, the electrode structure is inserted into an enclosure (301). This is done such that the cathode interface (201), the anode interface (202, the cathode conductive tab (303), and the anode conductive tab (304) are all disposed within the enclosure (301).

At step 704, the enclosure (301) is sealed about the interconnect extension (209) such that the cathode conductive tab (303) and the anode conductive tab 304 are sealed within the enclosure. The interconnect extension (209) projects distally as a singular electrical coupling from the enclosure (301). In one embodiment, the step 704 of sealing further comprises disposing a pair of sealing members (401,402) about the interconnect extension (209) and sealing about the pair of sealing members (401,402) by a heat-sealing process.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention.

What is claimed is:

1. An electrochemical cell, comprising:
   an enclosure having an opening;
   a cathode disposed within the enclosure, the cathode having a cathode conductive tab electrically coupled to the cathode and emanating therefrom;
   an anode disposed within the enclosure, the anode having an anode conductive tab electrically coupled to the anode and emanating therefrom;
   a separator disposed between the anode and the cathode;
   a substrate having a cathode interface, an anode interface, and an interconnect extension, the cathode interface being electrically coupled to the cathode conductive tab, and the anode interface being electrically coupled to the anode conductive tab; and
   wherein the interconnect extension comprises a first conductor, a second conductor, an external cathode connector, and an external anode connector, wherein the first conductor is electrically coupled to the cathode interface, the second conductor is electrically coupled to the anode interface, the first conductor terminates at the external cathode connector, and the second conductor terminates at the external anode connector; and
   wherein the opening is sealed as a closure about the interconnect extension such that a portion of the substrate comprising the cathode conductive tab and the anode conductive tab are sealed within the enclosure and the interconnect extension projects distally as a singular electrical cell coupling from the closure such that another portion of the substrate comprising the external cathode connector and the external anode connector is disposed is disposed outside the enclosure,
   wherein the interconnect extension comprises a coupling, wherein both the first conductor and the second conductor terminate at the coupling, and
   wherein each of the first conductor and the second conductor comprise conductive traces disposed on a substrate material.

2. The electrochemical cell of claim 1, wherein the interconnect extension comprises a first face and a second face, wherein the electrochemical cell further comprises a pair of sealing members, with a first sealing member disposed along the first face and a second sealing member disposed along the second face.

3. The electrochemical cell of claim 2, wherein the opening is sealed as the closure about the pair of sealing members.

4. The electrochemical cell of claim 1, wherein the electrochemical cell comprises a lithium ion polymer cell.

5. The electrochemical cell of claim 1, wherein the anode comprises a first plurality of layers, wherein the anode conductive tab comprises a first plurality of stacked tabs, further wherein the cathode comprises a second plurality of layers, wherein the cathode comprises a second plurality of stacked tabs.

6. The electrochemical cell of claim 5, wherein the first plurality of layers and the second plurality of layers are stacked together.

7. The electrochemical cell of claim 5, wherein the first plurality of layers and the second plurality of layers are wound together.

8. The electrochemical cell of claim 1, wherein the closure comprises a hermetic seal.

9. The electrochemical cell of claim 1, wherein the substrate comprises a first face and a second face, wherein both the anode conductive tab and the cathode conductive tab are coupled to the first face.

10. The electrochemical cell of claim 9, wherein the substrate comprises a flexible substrate and is T-shaped.

11. The electrochemical cell of claim 1, wherein the substrate comprises a first face and a second face, wherein the anode conductive tab is coupled to the first face and the cathode conductive tab is coupled to the second face.

12. The electrochemical cell of claim 1, wherein both the anode and the cathode have a width of less than 12 millimeters.

13. The electrochemical cell of claim 1, wherein each of the anode, the separator, and the cathode are coupled together so as to have a first end, a second end, and a major face, wherein one of the anode conductive tab or the cathode conductive tab emanates from the first end and one of the anode conductive tab or the cathode conductive tab emanates from the second end and traverses the major face.

14. An electrochemical cell, comprising:
    an enclosure having an opening;
    a cathode disposed within the enclosure and having a cathode conductive tab electrically coupled thereto;
    an anode disposed within the enclosure and having an anode conductive tab electrically coupled thereto;
    a substrate having substrate material, a cathode interface disposed on the substrate material, an anode interface disposed on the substrate material, and an interconnect extension, the cathode interface being electrically coupled to the cathode conductive tab, and the anode interface being electrically coupled to the anode conductive tab; and
    wherein the interconnect extension comprises a first conductor terminating at a first external connector, a second conductor terminating at a second external connector, wherein the first conductor is electrically coupled to the cathode interface, the second conductor is electrically coupled to the anode interface;
    wherein each of the first conductor and the second conductor are disposed on the substrate material;
    wherein the opening is sealed as a closure about the interconnect extension such that the cathode conductive tab and the anode conductive tab are sealed within the enclosure and the interconnect extension projects distally from the closure;
    wherein each of the first conductor and the second conductor comprise conductive traces disposed on the substrate material.

15. The electrochemical cell of claim 14, wherein the substrate comprises a flexible substrate.

* * * * *